United States Patent Office.

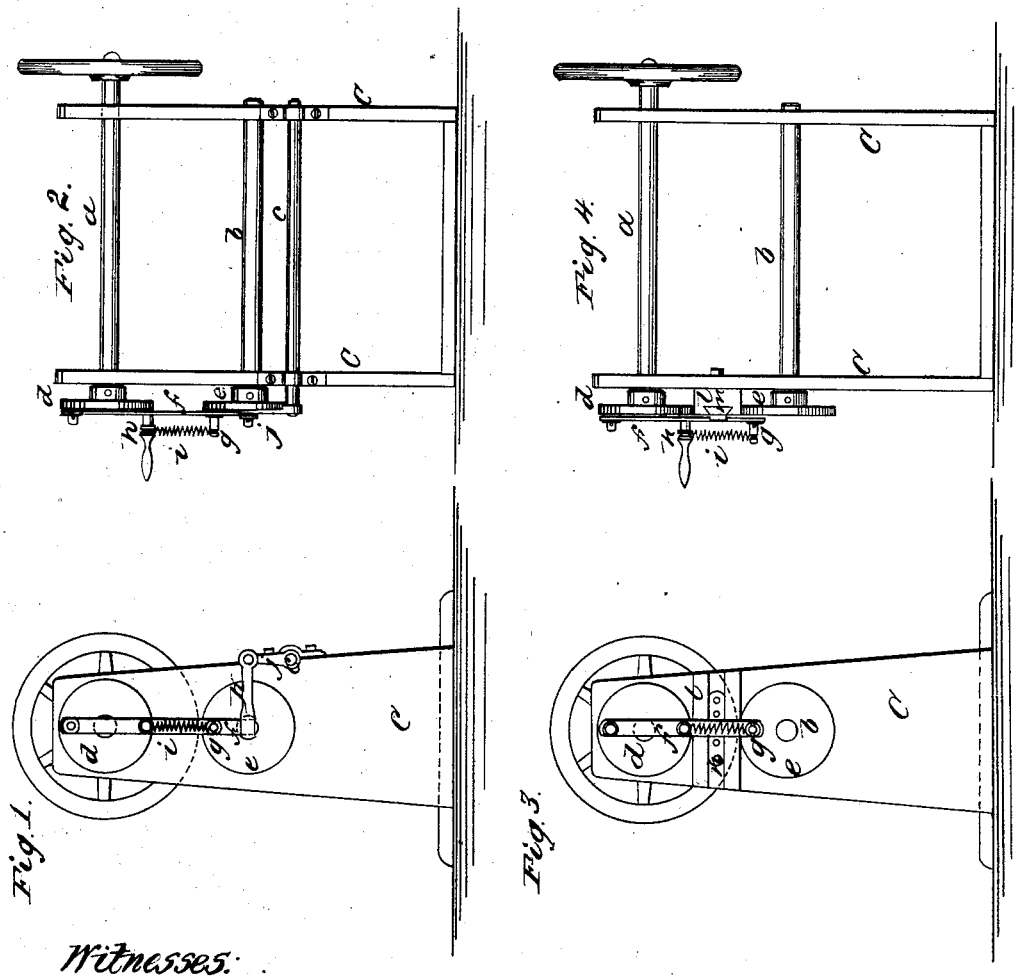

JULIUS NIEBERGALL, OF NEW YORK, N. Y.

Letters Patent No. 69,929, dated October 15, 1867.

---

IMPROVEMENT IN MECHANICAL MOVEMENT.

---

The Schedule referred to in these Letters Patent and making part of the same.

---

TO ALL WHOM IT MAY CONCERN:

Be it known that I, JULIUS NIEBERGALL, of the city of New York, in the county and State of New York, have invented a new and useful Improvement in Mechanical Movements; and I do hereby declare that the following is a full, clear, and exact description thereof, which will enable those skilled in the art to make and use the same, reference being had to the accompanying drawing, in which drawing—

Figure 1 is an end view of an apparatus which illustrates my invention.

Figure 2 is a front elevation thereof.

Figures 3 and 4 are like views of a modification of my invention.

This invention consists in a new method of transmitting motion, by means of which a continuous rotary motion is communicated from one shaft to another through an ordinary connecting-rod.

The letters $a$ $b$ designate two shafts, which are supported in suitable standards O. The shaft $a$ is the driving-shaft, and $b$ is the shaft to which a continuous rotary motion is to be communicated. The said shafts on their corresponding or adjacent ends have disks $d$ $e$, to which are attached, by suitable pins, the connecting-rod $f$, that connects the shafts to each other. The pins on the respective disks are placed at like distances from the centres of the shafts, and to the lower end of the connecting-rod is rigidly attached one end of an arm, $k$, which is loosely attached at its other end to the crank $j$ of a shaft, $c$, observing figs. 1 and 2, the length of said crank being equal to the distance of the pin $g$ from the centre of shaft $b$.

In operating these devices, motion is given to the driving-shaft $a$, when the same will be communicated through the connecting-rod $f$ to the driven shaft $b$, the latter shaft being compelled to perform a full or entire revolution in equal time with the shaft $a$, by reason of the connection with the rigidly attached arm $k$ and the crank-shaft and crank $c$ $j$, so that said shaft $b$ is not permitted to rock or perform only partial revolutions, as it would do if the lower end of said connecting-rod were free.

In order to maintain the connecting-rod and the shafts $a$ $b$ in proper relations with each other, and compensate for and prevent loss or irregularity of motion from the effects of wear on the pin $g$, which connects the rod $f$ to the disk $e$, I have provided a spring, $i$, which operates to keep the rod and pin in close contact with each other. The said pin $g$ projects from the face of said disk $e$, and goes through an opening in said connecting-rod, so that the latter turns thereon. When the pin or the opening in the connecting-rod becomes worn, so that it fits loosely, it is necessary to obviate or prevent the loss of motion which will be caused thereby, otherwise the shaft $b$ would not be made to perform a complete revolution. In order to prevent such a result, I draw the pin $g$ and the rod $f$ towards each other by a spring, $i$, whose one end is attached to the pin, and the other end to a stud, $h$, that projects from the rod at a point between the two shafts. The spring keeps the pin $g$ and the rod in constant contact, and consequently prevents any loss or irregularity of motion arising from the looseness of the pin by reason of wear or otherwise. It will be observed that the rigid arm $k$, in conjunction with the crank $j$, guides the movements of the rod $f$, and preserves its parallelism with a line extending from one shaft to the other. In figs. 3 and 4 I have shown a modification of my invention, where the same result is obtained without the use of the crank-shaft $c$, the parallelism of the connecting-rod being maintained by a slide, $m$. In this modification the shafts $a$ $b$, their disks $d$ $e$, the connecting-rod $f$, and the tightening-spring $i$, are arranged in the same manner as in the preceding example, and they require no further explanation. Upon the adjacent side of the frame O, between the shafts $a$ $b$, I provide a guide or groove, $l$, in which I place a slide, $m$, across whose face is a recess or groove which receives the connecting-rod $f$ loosely, so as not to bind or stick in its movements. The slide $m$ is carried to and fro in its groove by the connecting-rod, and the rod moves freely across the face of the slide, so that the movements of the several parts of the mechanism are not obstructed or impeded, while the object of my invention is yet perfectly accomplished, the connecting-rod being kept at all periods of its movements in positions parallel with a straight line extending from the axis of shaft $a$ to the axis of shaft $b$, the groove across the slide being vertical, with straight sides, so as to prevent the rod $f$ from oscillating or tilting.

By means of this invention I am thus enabled to give a continuous rotary motion to the driven shaft by means of a simple connecting-rod extending from one shaft to the other, the connecting-rod being connected to the shaft either by pins projecting from disks on the ends of the said shafts, or by crank-arms, care being taken that the distances from the centres of the shafts to the points of connection be the same for each end of the rod, and that little or no play be allowed between the connecting-rod and the pin or crank of the driven shaft.

What I claim as new, and desire to secure by Letters Patent, is—

1. The combination, with the shafts $a\ b$ and the connecting-rod $f$, of the arm $k$ and crank $j$, substantially as set forth.

2. The method, substantially as herein shown, of transmitting continuous rotary motion to a driven shaft, through a connecting-rod extending from the driving-shaft, by keeping the said rod at all times in a position parallel with a straight line extending from the driving to the driven shaft.

JULIUS NIEBERGALL.

Witnesses:
   GUSTAV BERG,
   HERMAN GROS.